United States Patent [19]

Boutaghou

[11] Patent Number: 5,590,004
[45] Date of Patent: Dec. 31, 1996

[54] RESILIENT CLAMP AND COMPLIANT ELEMENT DATA DISK SUPPORT SYSTEM

[75] Inventor: Zine-Eddine Boutaghou, Rochester, Minn.

[73] Assignee: International Business Machines Corporation, Armonk, N.Y.

[21] Appl. No.: 366,960

[22] Filed: Dec. 30, 1994

[51] Int. Cl.[6] ............ G11B 17/02; G11B 17/08; G11B 23/00; G11B 25/00
[52] U.S. Cl. ............ 360/99.12; 360/98.08; 369/270; 369/271
[58] Field of Search ............ 360/99.12, 97.01, 360/98.07, 98.08, 97.02, 99.05; 369/270, 271

[56] References Cited

U.S. PATENT DOCUMENTS

| | | |
|---|---|---|
| 3,587,074 | 6/1971 | Angle et al. . |
| 3,608,686 | 9/1971 | Martin, Sr. et al. ............ 192/150 |
| 4,022,478 | 5/1977 | Stewart . |
| 4,577,756 | 3/1986 | Hennessy et al. . |
| 4,835,637 | 5/1989 | Mach et al. . |
| 4,864,443 | 9/1989 | Peterson . |
| 4,933,927 | 6/1990 | Ross . |
| 4,945,432 | 7/1990 | Matsudaira et al. . |
| 5,006,942 | 4/1991 | Brooks et al. . |
| 5,025,340 | 6/1991 | Peters . |
| 5,075,808 | 12/1991 | Johnson . |
| 5,101,306 | 3/1992 | Johnson . |
| 5,243,481 | 9/1993 | Dunckley et al. . |
| 5,267,106 | 11/1993 | Brue et al. ............ 360/98.08 |
| 5,270,999 | 12/1993 | Chessman et al. . |
| 5,272,581 | 12/1993 | Kojima et al. . |
| 5,274,517 | 12/1993 | Chen . |
| 5,317,225 | 5/1994 | Miyaji et al. . |

FOREIGN PATENT DOCUMENTS

| | | |
|---|---|---|
| 60-193156 | 10/1985 | Japan . |
| 1-42052 | 2/1989 | Japan . |
| 2-166682 | 6/1990 | Japan . |
| 4-255957 | 2/1991 | Japan . |
| 3-134854 | 6/1991 | Japan . |
| 4-195958 | 7/1992 | Japan . |
| 2158633 | 11/1985 | United Kingdom . |

Primary Examiner—John H. Wolff
Assistant Examiner—Adriana Giordana
Attorney, Agent, or Firm—Merchant, Gould, Smith, Edell, Welter & Schmidt, P.A.

[57] ABSTRACT

A disk assembly comprising a spindle disposed rotatably around a fixed axis. The spindle comprises a rim formed at a lower portion of the spindle and a flange spaced axially above the rim. At least one disk having a recording surface for recording data is positioned on the spindle. The at least one disk has an upper side facing the flange and a lower side facing the rim. A resilient clamping member is positioned so that an upper end faces the flange and a lower end faces the upper side of the at least one disk. In addition, a compliant element is supported by the rim. The compliant element is supported by the rim so that the upper portion of the compliant element is compressed toward the upper surface of the rim by the bias of the resilient clamping member under normal operation and so that, during a high shock capable of separating the at least one disk from the upper surface of the rim, the compliant element fills at least a portion of the space between the lower side of the at least one disk and the upper surface of the rim.

18 Claims, 9 Drawing Sheets

RESILIENT CLAMP AND COMPLIANT ELEMENT DATA DISK SUPPORT SYSTEM

FIELD OF THE INVENTION

The present invention pertains to rotating disk data storage devices and more particularly to a resilient clamp and compliant element for securing one or more data disks on a spindle.

BACKGROUND

The extensive data storage needs of modern computer systems require large capacity mass data storage devices. A common storage device is the rotating magnetic disk drive containing magnetic or optical data storage disks.

A disk drive typically contains one or more smooth, flat disks which are attached to a common hub or spindle. If more than one disk is employed in a drive, they are stacked on the spindle parallel to each other and spaced apart so that they do not touch one another. A clamping mechanism secures the disk or disks to the hub. The disks and hub are rotated in unison at a constant speed by a spindle motor.

Each disk is formed of a solid disk-shaped base or substrate, having a hole in the middle for the spindle. The substrate is commonly aluminum, although glass, ceramic, plastic or other materials are possible. In the case of a magnetic disk, the substrate is coated with a thin layer of magnetizable material, and may additionally be coated with a protective layer.

Data is recorded on the surfaces of magnetic disks in the magnetizable layer. To do this, minute magnetized patterns representing the data are formed in the magnetizable layer. The data patterns are usually arranged in circular concentric tracks. Each track is further divided into a number of sectors. Each sector thus forms an arc, with all the sectors of a track completing a circle.

A moveable actuator positions a transducer head adjacent the data on the surface to read or write data. The actuator may be likened to the tone arm of a phonograph player, and the head to the playing needle.

There is one transducer head for each disk surface containing data. Each transducer head is an aerodynamically shaped block of material (usually ceramic) on which is mounted a read/write transducer. The block, or slider, typically flies above the surface of the disk at an extremely small distance as the disk rotates. In the case of a magnetic disk, the close proximity to the disk surface is critical in enabling the transducer to read from or write to the data patterns in the magnetizable layer. Several different transducer designs are used, and in some cases the read transducer is separate from the write transducer.

The actuator usually pivots about an axis to position the head. It typically includes a solid block near the axis having comb-like arms extending toward the disk, a set of thin suspensions attached to the arms, and an electro-magnetic motor on the opposite side of the axis. The transducer heads are attached to the suspensions, one head for each suspension. The actuator motor rotates the actuator to position the head over a desired data track. Once the head is positioned over the track, the constant rotation of the disk will eventually bring the desired sector adjacent the head, and the data can then be read or written.

The clamp that secures one or more data storage disks within an enclosure for rotation in unison with a hub must meet several well recognized design constraints. Among these are the ability to preclude slippage of the disk relative to other portions of the rotating assembly during acceleration and deceleration of the spindle assembly and the capability to resist side shock loads without displacement of a disk with respect to the balance of the assembly. In addition, the clamping force must not distort the disk and the clamp must be capable of assembly and removal without damage to other assembly components including the disks, spindle motor or spindle bearing assemblies and further, the device must not be the source of contaminants within the enclosure in the form of either debris or outgassing of the component materials.

A typical clamping technique is the use of a series of screws that are equiangularly spaced to secure a circular clamp to compressively retain the disk or disks between the clamp and a flange formed as a part of the hub. This technique can result in the localized distortion of the disk adjacent the site of each screw. This phenomena was of little consequence when larger disk sizes and lower areal recording densities were used, but such factors are of concern as disk drive miniaturization occurs. Further, with drives using 1.8 inch (45.7 mm) diameter disks and subject to the dimensional limitations of the associated form factor, the use of a pattern of clamping bolts with the required torque limitations is an unacceptable solution for purposes of mass production manufacturing.

A solution which is a more acceptable manufacturing technique is the use of a shrink fit clamp which is assembled using the required clamping force and allowed to cool and establish a shrink fit about the hub. However, when this approach is utilized in the environment of a small drive using a 1.8 inch (45.7 mm) diameter disk, the radial constricting forces tend to affect the running accuracy of the bearing assembly that is mounted at the opposite side of the same hub wall.

Any clamping technique must be considered with respect to the problems of radial and axial runout that can be influenced by distortion induced by the clamping forces. Radial distortion causes tracks to become noncircular, but the problem can be overcome by writing the tracks subsequent to assembly of the disks to the hub. Axial runout is the variation in disk flatness or the departure from a planar surface that tends to vary the flyheight of the transducer head during a cycle of rotation. As the space separating the transducer head from the disk becomes smaller, such as approaching two microinches ($50.8 \times 10^{-6}$ mm), the disk flatness becomes a significant concern, and phenomena such as disk clamping that influence such flatness must not impair or compromise this disk parameter.

A typical objective is to design an inexpensive clamp with an extra low profile to provide both axial and radial clamping forces. Although many related design problems have long been recognized, the attendant difficulties have become progressively more acute as requirements call for continuously higher areal data recording densities and smaller physical dimensions. Disk diameters of the smallest disk drives have progressed from 3.5 inches (88.9 mm), to 2.5 inches (63.5 mm), and presently to 1.8 inches (45.7 mm). In addition, it must be anticipated that the future will have a requirement for a drive using one inch (25.4 mm) diameter disks.

Another problem in the art is bearing damage contributed by the mass and inertia of the disk stack. For example, some spindles experience an acoustic increase after exposure to a shock acceleration of 200 Gs, and this acoustic increase is an indication of bearing damage. The harmonics present in the acoustic signature of the spindle match the bearing frequencies.

Simple calculations by the inventor have indicated that a resilient clamp decouples the mass and inertia of the disk from the spindle. Furthermore, during the application of shock, the disk separates from the spindle hub. This physical separation may not be desirable from several viewpoints including particle generation, unpredictable contact forces between the hub and the disk, and local disk indentation which may cause changes in disk flatness.

Accordingly, there is a need to reduce shocks transmitted to the hub during disk bouncing. It is also desirable to avoid dinging of the disk during bouncing of the disk onto the hub. This fact is crucial for maintaining the flatness of the disk. It is well known that very small dents in the disk internal diameter can result in substantial disk curvature problems. It is also desirable to reduce the number of bounces of the disk onto the hub and to reduce the amount of vibration transmitted to the disk from the bearings and the motor. It would be desirable to find a solution to these problems so that thin disks can be used with little or no change to the existing spindle design.

SUMMARY OF THE INVENTION

The present invention comprises a disk assembly which includes a spindle disposed rotatably around a fixed axis. The spindle comprises a rim formed at a lower portion of the spindle and a flange spaced axially above the rim. At least one disk having a recording surface for recording data is positioned on the spindle. The at least one disk has an upper side facing the flange and a lower side facing the rim. A resilient clamping member is positioned so that an upper end faces the flange and a lower end faces the upper side of the at least one disk. In addition, a compliant element is supported by the rim. The compliant element is supported by the rim so that the upper portion of the compliant element is compressed toward the upper surface of the rim by the bias of the resilient clamping member under normal operation and so that, during a shock capable of separating the at least one disk from the upper surface of the rim, the compliant element fills at least a portion of the space between the lower side of the at least one disk and the upper surface of the rim.

In the event of a high shock capable of separating a disk from the hub, the compliant element, by expanding to fill the gap or gaps created, reduces the impact of the disk onto the hub. Various benefits are yielded from this solution.

There is a reduction in shocks transmitted to the hub during disk bouncing.

The assembly helps avoid dinging of the disk during bouncing of the disk onto the hub, thus helping to avoid related disk curvature problems.

The present invention also reduces the number of bounces of the disk onto the hub and reduces the amount of vibration transmitted to the disk from the bearings in the motor.

The present invention provides these advantages both during operational and non-operational shock.

DETAILED DESCRIPTION

Figure 9:
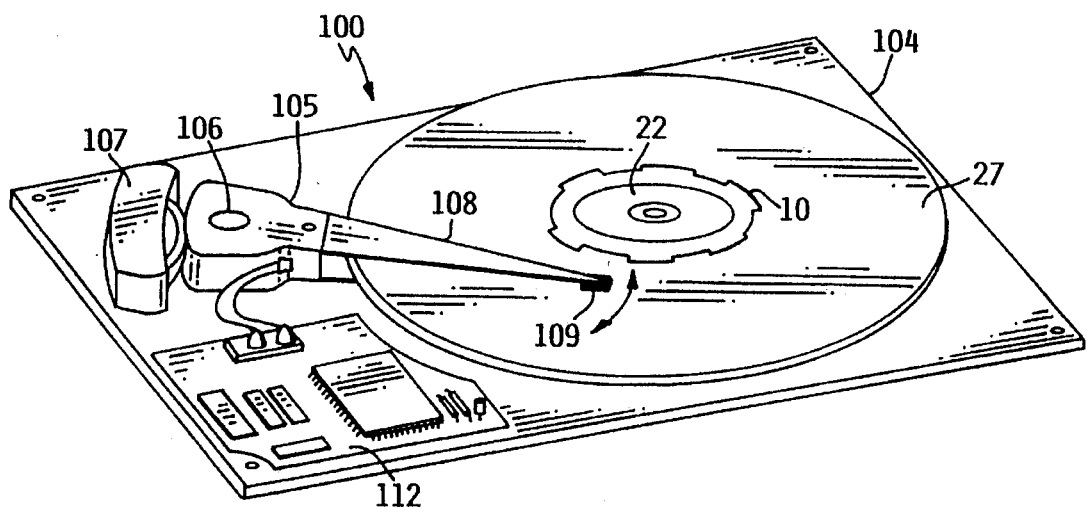
FIG. 9 shows a magnetic disk drive storage unit according to a preferred embodiment of the present invention.

FIG. 9 shows a magnetic disk drive storage unit 100 in accordance with a preferred embodiment. Disk unit 100 comprises rotatable disk 27, which is attached to hub assembly or spindle 22. Hub assembly 22 is rotatably mounted on disk drive base or housing 104. Spindle 22 and disk 27 are driven by a drive motor at a constant rotational velocity. The drive motor is contained within hub assembly 22. Actuator assembly 105 is situated to one side of disk 27. Actuator 105 rotates through an arc about shaft 106 parallel to the axis of the spindle, driven by electro-magnetic motor 107, to position the transducer heads. A cover (not shown) mates with base 104 to enclose and protect the disk and actuator assemblies. Electronic modules for controlling the operation of the drive and communicating with another device, such as a host computer, are mounted on a circuit card 112 within the head/disk enclosure formed by base 104 and the cover. In this embodiment, circuit card 112 is mounted within the enclosure and shaped to take up unused space around the disk in order to conserve space, as would be used for a small form factor disk drive. However, card 112 could also be mounted outside the head/disk enclosure, or the base itself could be made as a circuit card for mounting electronic modules directly to it. A plurality of head/suspension assemblies 108 are rigidly attached to the prongs of actuator 105. An aerodynamic read/write transducer head 109 is located at the end of each head/suspension assembly 108 adjacent the disk surface.

Figure 10:
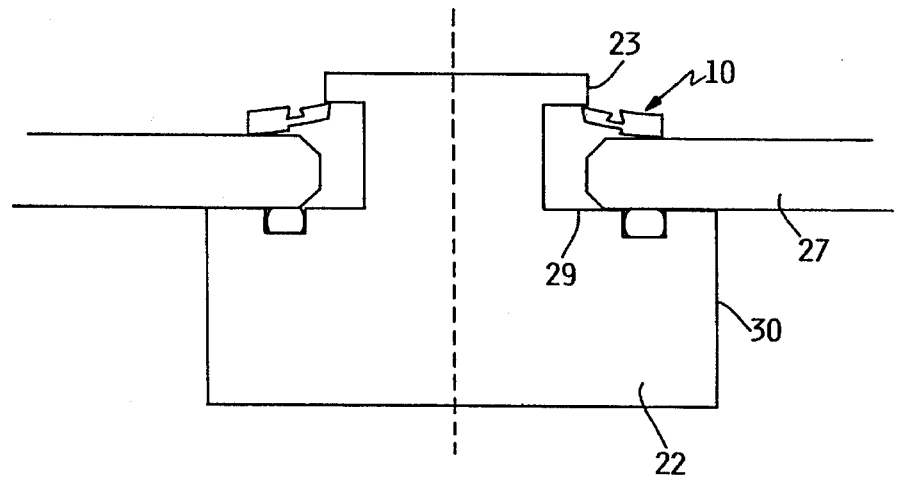
FIG. 10 illustrates a preferred embodiment of the present invention in which an O-ring fitted within a groove defined in a rim on the lower portion of the spindle is fully compressed during the insertion of a disk and installation of an upper axial resilient clamp.
Figure 10A:
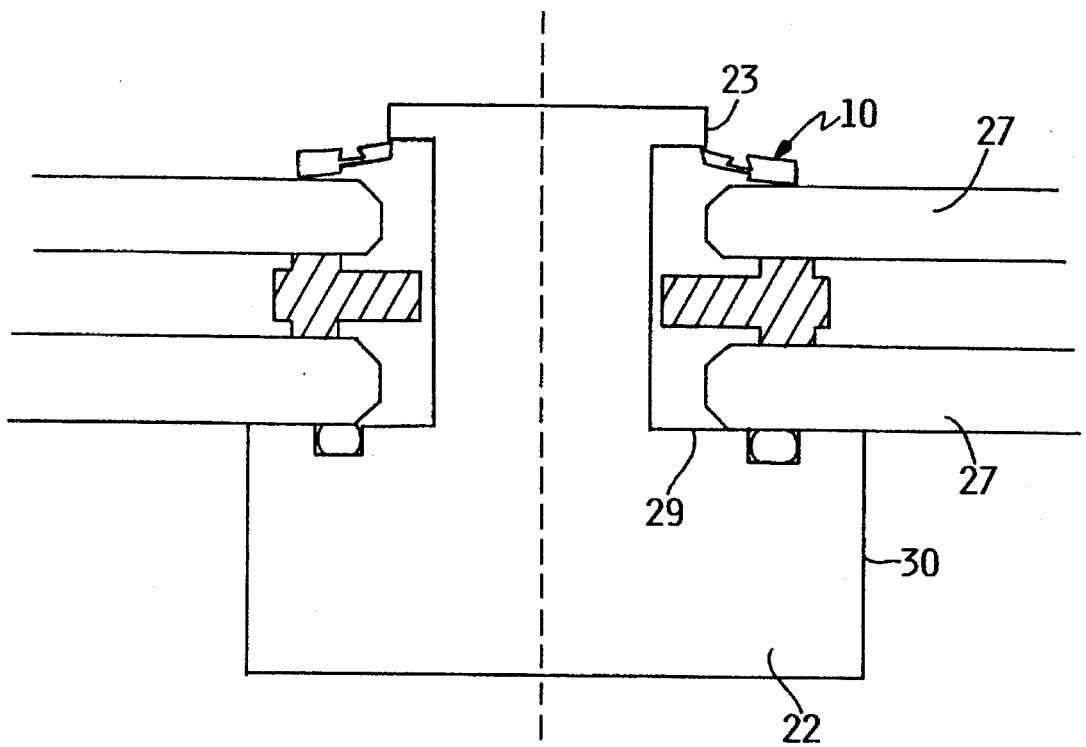
FIG. 10A illustrates an embodiment of the present invention utilizing multiple disks separate by spacers.

While disk drive 100 is shown with a single disk such as would be used for a small form factor (e.g., PCMCIA Type II form factor), it should be understood that the present invention could utilize a drive having multiple disks mounted on the spindle as shown in FIG. 10A.

Figure 1:
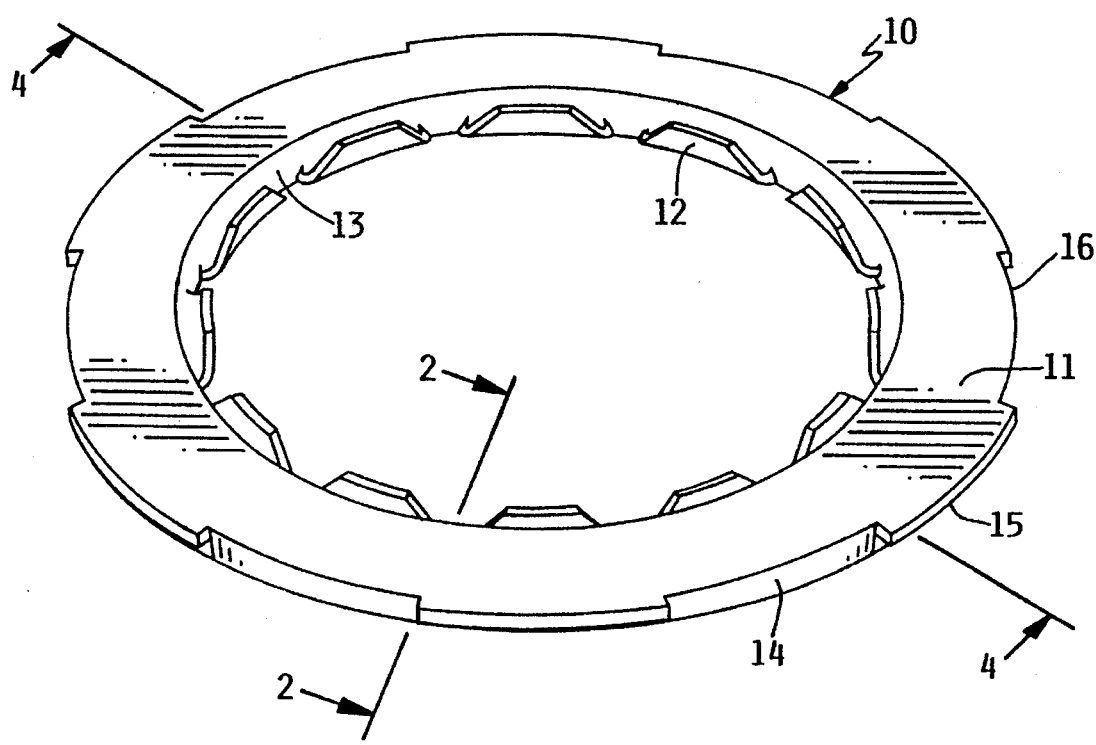
FIG. 1 is an isometric view of a preferred embodiment of a resilient clamp element of the present invention.
Figure 2:
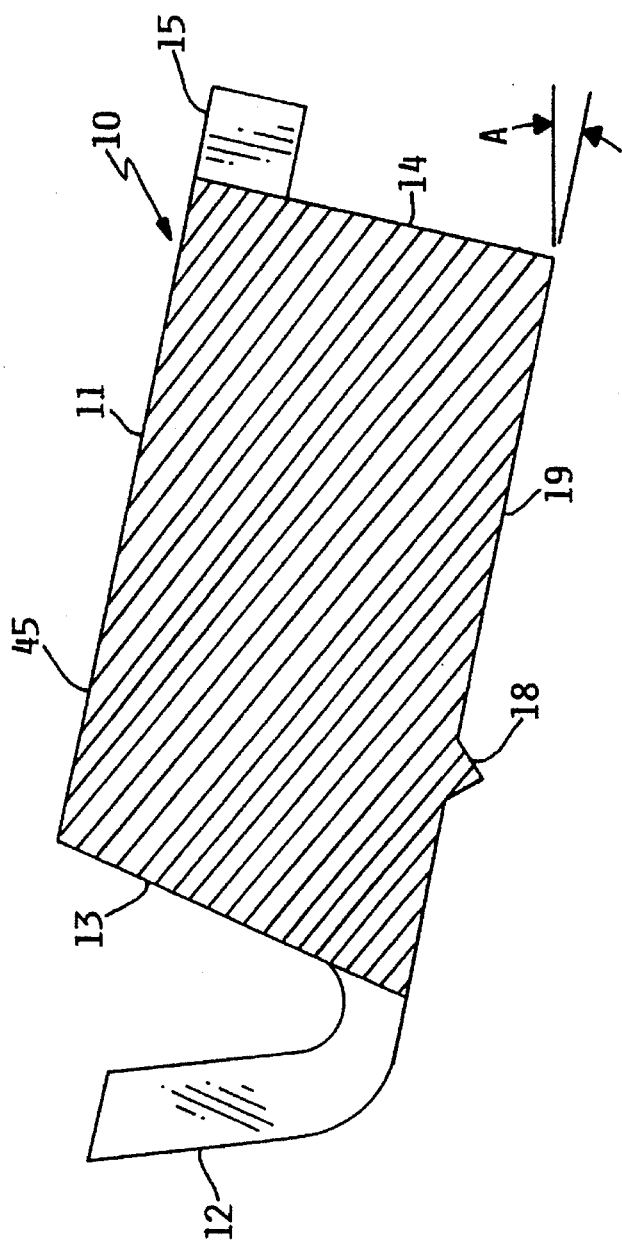
FIG. 2 is a section view of the clamp of FIG. 1 taken along line 2—2 of FIG. 1.
Figure 4:
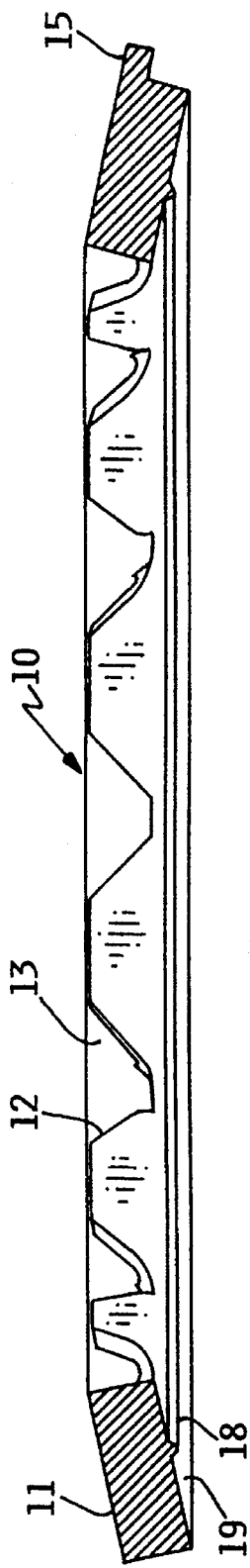
FIG. 4 is a section view of the clamp taken along line 4—4 of FIG. 1.
Figure 3:
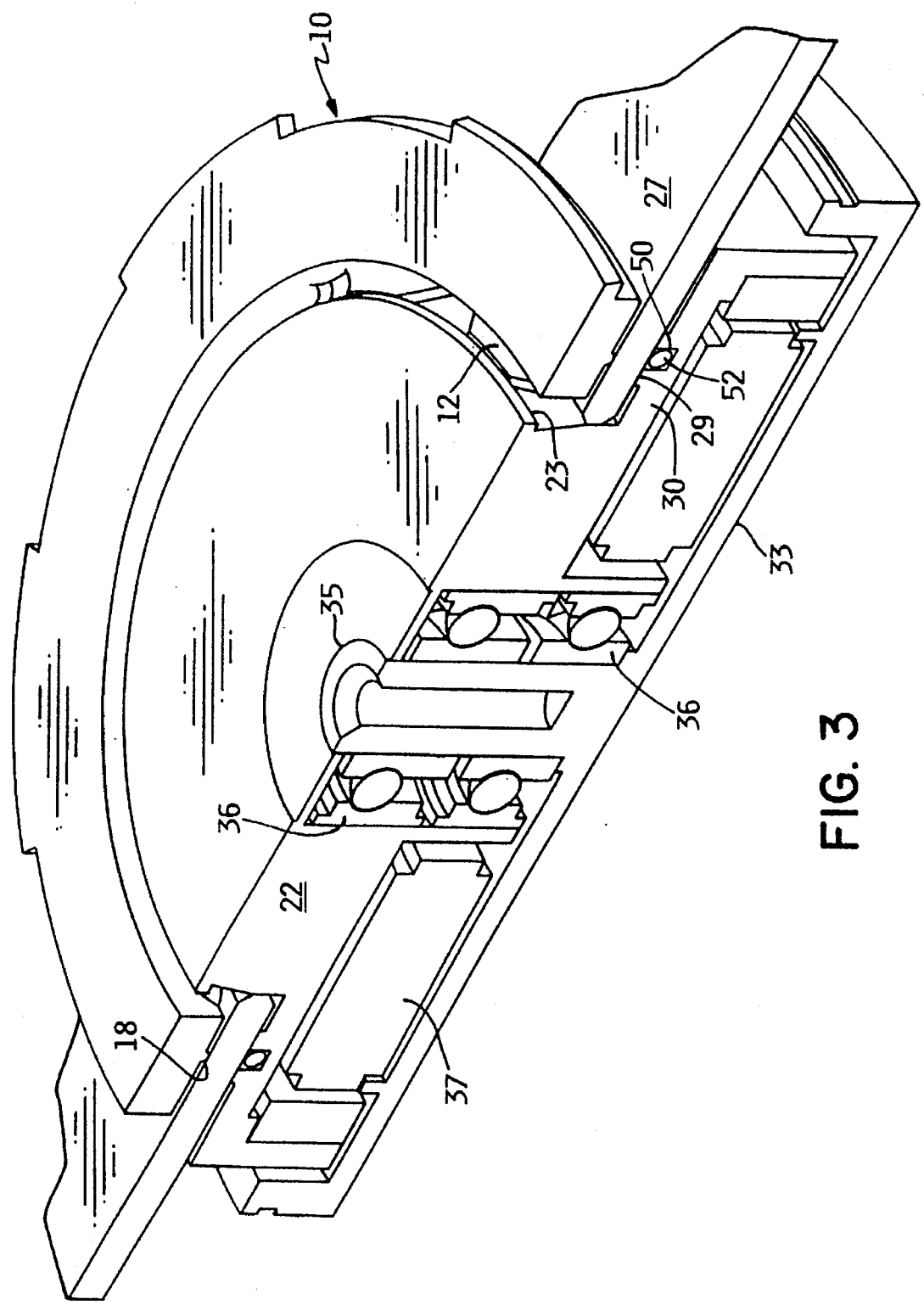
FIG. 3 is an isometric section view, partly broken away, of a hub disk assembly mounted on a spindle motor base member which includes a shaft about which the hub-disk assembly rotates.

FIG. 1 is an isometric view of the preferred embodiment of a resilient clamp 10 of the present invention. Clamp 10 includes an annulus 11 from which a series of ears or lobes 12 extend from an inner diameter, generally frusto-conical surface 13. At the outer generally cylindrical surface 14, an interrupted flange is formed with a series of six flange type projections 15 separated by a like series of interrupted angular portions 16. FIGS. 2 and 4 also show the lobes 12 which extend inward and upward from the surface 13 and the flange segments 15. The lobe 12 upward and inward projection and the reduced thickness permit axial assembly of the clamp 10 wherein the lobes 12 yield radially inward as the clamp is forced over the end of the hub 22. As the clamp is axially forced over the hub, the ears or lobes 12 spring behind the hub flange 23, as seen in FIG. 3 showing the assembled condition. Additionally, an annular projection 18 extends axially downward from the annulus lower surface 19. The upper and lower axial end surfaces 45 and 19 of the clamp annulus 11 are slightly frusto-conical, diverging from a radial plane by an angle A of 12 degrees as shown. In the assembled condition, the displacement or twisting of the clamp annulus 11 to a configuration where the axial end surfaces are substantially radial provides a significant portion of the clamping force. The angle A may vary widely depending upon the component material parameters, the clamping force used, and the geometry of both the clamp and the cooperating spindle hub. For example, if the clamp design were used with a glass disk, the amount of glass filler added to the resilient plastic material would be significantly increased to achieve a clamp coefficient of thermal expansion that is identical to that of the glass disk. Such a clamp would have a reduced resiliency and, accordingly, the magnitude of angle A would be reduced.

Clamp 10 requires the use of a compliant material such as polymer based materials. In the environment of the present invention, Ultem 6000/2400 was selected due its superior thermal stability (Ultem is a trademark of GE Company). Polymer-based materials are readily available which have good thermal behavior, limited susceptibility to humidity and low outgassing tendencies. Such materials can further be filled with glass and carbon in order to match the coefficient of linear expansion of the aluminum disk.

FIG. 3 shows the assembled clamp 10 compressively retaining disk 27 to hub 22. With the clamp captured by the cooperation of the flange 23 with the clamp lobes 12, the annular projection 18 compresses and deforms against the upper surface of disk 27 to compressively bias the disk toward and preferably against the raised annular surface 29 of hub rim 30. A compressive force is also applied by displacement of the clamp from the frusto-conical configuration of the unassembled clamp to the substantially radial surface of the axial ends in the assembled condition.

In addition to resilient clamping member 10, the combination of the present invention comprises a compliant element 52 supported by rim 30 of spindle or hub 22. Compliant element 52 is supported by rim 30 so that the upper portion of the compliant element is compressed toward the upper surface 29 of rim 30 by the bias of resilient clamping member 10 under normal operation and so that, during a shock capable of separating disk 27 from upper surface 29 of the rim, the compliant element fills at least a portion of the space between the lower side of disk 27 and the upper surface of the rim.

In the preferred embodiment, the spindle or hub defines a recess 50 formed into upper surface 29 of rim 30. The compliant element is placed into recess or groove 50 so that, in its relaxed state, a portion of the compliant element protrudes above upper surface 29 of rim 30.

Compliant element 52 requires the use of a compliant material such as polymer based materials. In the environment of the present invention, Ultem 6000/2400 was selected due its superior thermal stability (Ultem is a trademark of GE Company). Polymer-based materials are readily available which have good thermal behavior, limited susceptibility to humidity and low outgassing tendencies. Such materials can further be filled with glass and carbon in order to match the coefficient of linear expansion of the aluminum disk. The material selected for compliant element 52 should comprise a material which will compress toward and preferably completely to upper surface 29 of rim 30 when under normal assembly or operating conditions and, during a shock capable of separating disk 27 away from upper surface 29 of rim 30, will fill at least a portion of space 54 (see FIG. 11B) between the lower side of disk 27 and upper surface 29 of rim 30.

Figure 11A:
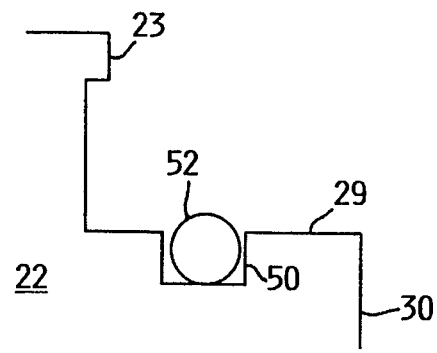
FIG. 11A illustrates the insertion of an O-ring into the spindle groove before insertion of the disk.
Figure 11B:
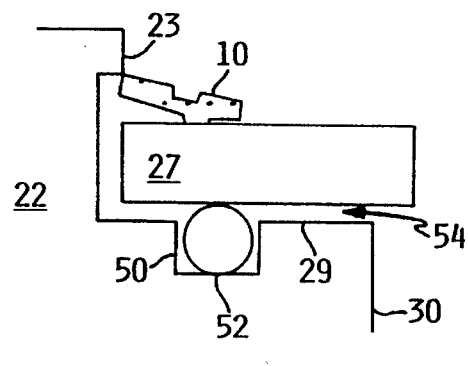
FIG. 11B illustrates insertions of a disk and resilient clamp.
Figure 11C:
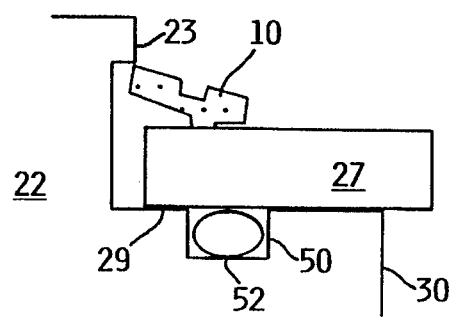
FIG. 11C illustrates separation/bouncing of the disk from the hub due to applied shocks, with the O-ring illustrated taking the slack and reducing the impact force transmitted from the disk to the hub/bearings.
Figure 13:
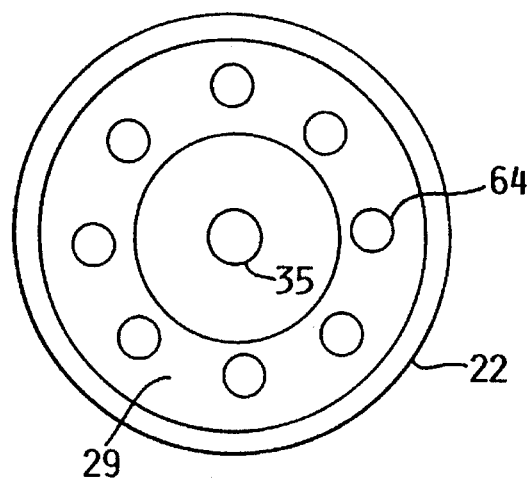
FIG. 13 illustrates the use of a set of independent soft balls which can be inserted along the periphery of a spindle underneath the disk to provide the benefits of the present invention.

The compliant element may comprise a variety of shapes. For example, the cross-sectional illustrations of FIGS. 11A, 11B, and 11C show the compliant element as an O-ring or ball 52. Note that, although recess or groove 50 is shown in rectangular cross section in these figures, a recess or groove 50 could be formed with varying cross sections, including cross sections with a rounded or oval configuration. If the compliant element 52 is an O-ring, recess 50 would typically be an annular groove. If the compliant element 52 comprises a series of elements, for example, a series of balls, recess 50 typically comprises a series of cups 64 (see FIG. 13) or the like to hold the individual compliant elements 52.

FIG. 11A illustrates the insertion of an O-ring or ball 52 into recess 50 in rim 30 of spindle 22. FIG. 11b illustrates insertion of disk 27 and resilient clamp 10. As previously noted, resilient clamp 10 provides a bias which compresses compliant element 52 so that the upper portion of the element, for example, the upper portion of an O-ring or ball 52, is compressed toward the level of upper surface 29 of rim 30 under normal operation. During a shock capable of separating disk 27 from upper surface 29 (see FIG. 11B), the compliant element such as O-ring or ball 52 fills at least a portion of space 54 above the element between the lower side of disk 27 and the upper surface 29 of rim 30. As is shown in FIG. 11C, it is preferable that resilient clamping member 10 fully compress the compliant element during insertion of disk 27 onto spindle 22 so that the compliant element is compressed completely to the level of upper surface 29 of the rim under normal non-shock operational or non-operational conditions. As previously indicated, under conditions of shock capable of separating disk 27 from upper surface 29 of the rim, the compliant element fills at least a portion of space 54 (see FIG. 11B) between the lower side of disk 27 and upper surface 29 of the rim.

Figure 12A:
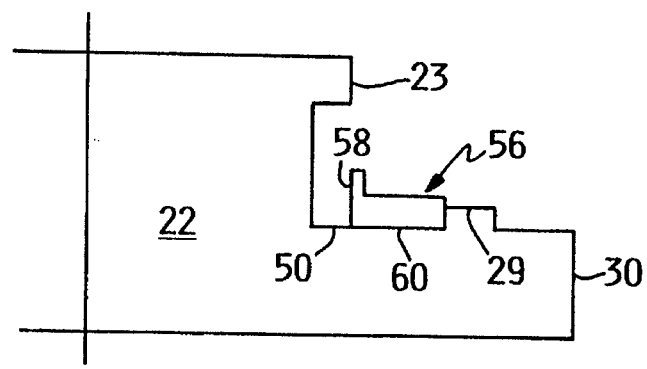
FIGS. 12A and 12B illustrate an embodiment in which the compliant element is configured as a soft ring molded in an "L" configuration to perform the added task of self-centering the disk.
Figure 12B:
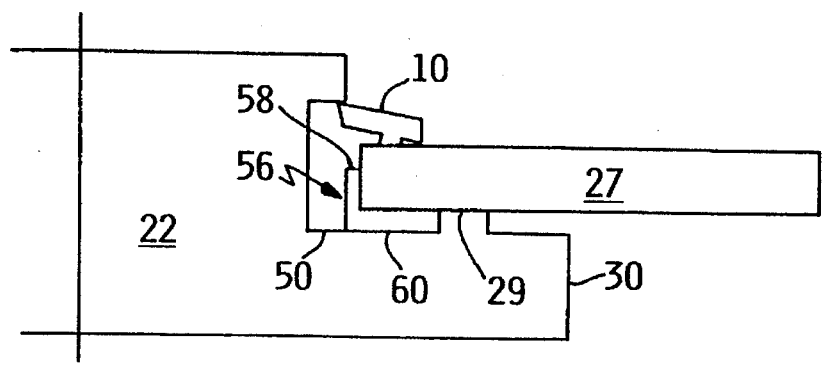

As is illustrated in FIGS. 12A and 12B, the compliant element may comprise a soft ring formed in substantially an "L" configuration comprising a vertical leg member 58 and a horizontal leg member 60. In this embodiment, vertical leg member 58 preferably provides an outer surface for self-centering disk 27, and horizontal leg member 60 is arranged and configured so that an upper portion of horizontal leg member 60 is compressed toward the level of (and preferably to the level of) upper surface 29 of the rim by resilient clamping member 10 under normal operation and so that, during a high shock capable of separating disk 27 from upper surface 29 of the rim, the horizontal leg member fills at least a portion of the space between the lower side of disk 27 and upper surface 29 of the rim.

As previously indicated, the present disk assembly may comprise a plurality of compliant elements supported by the rim wherein each of the compliant elements are supported by the rim and are compressed toward the level of (and preferably to the level of) upper surface 29 of the rim by resilient clamping member 10 under normal operation and so that, during a shock capable of separating disk 27 from upper surface 29 of the rim, each of the compliant elements fill at least a portion of the space above the elements between the lower side of disk 27 and upper surface 29 of the rim. As also previously indicated, in a preferred embodiment, the plurality of compliant elements may each comprise a ball, which may be held in place on the rim of spindle or hub 22 by cups 64. Cups 64 may have a square, round, oval or other cross-sectional configuration.

FIG. 3 also illustrates the organization of a typical hub and spindle motor. The spindle motor includes a base member 33 from which projects a dead shaft 35 about which the hub-disk assembly rotates, being supported on the shaft 35 by a pair of ball bearing assemblies 36. The spindle motor includes core and winding elements 37 supported on the base surface and an annular permanent magnet secured to hub 22. Hub 22 is formed of steel which provides electromagnetic isolation of the spindle motor from the other magnetic systems of the data storage drive mechanism and eliminates the need for an additional magnetically permeable element to provide a flux path for the motor.

It should be appreciated that, while the figures illustrating the structure of the preferred resilient clamp 10 of the present invention are shown enlarged for ease of understanding, in the actual environment of use, the clamp is much smaller. In a disk drive using 1.8 inch (45.7 mm) diameter disks, the inner diameter of the disk 27 of FIG. 3 is 18 mm, only a fraction of the dimension of the illustration.

Figure 5:
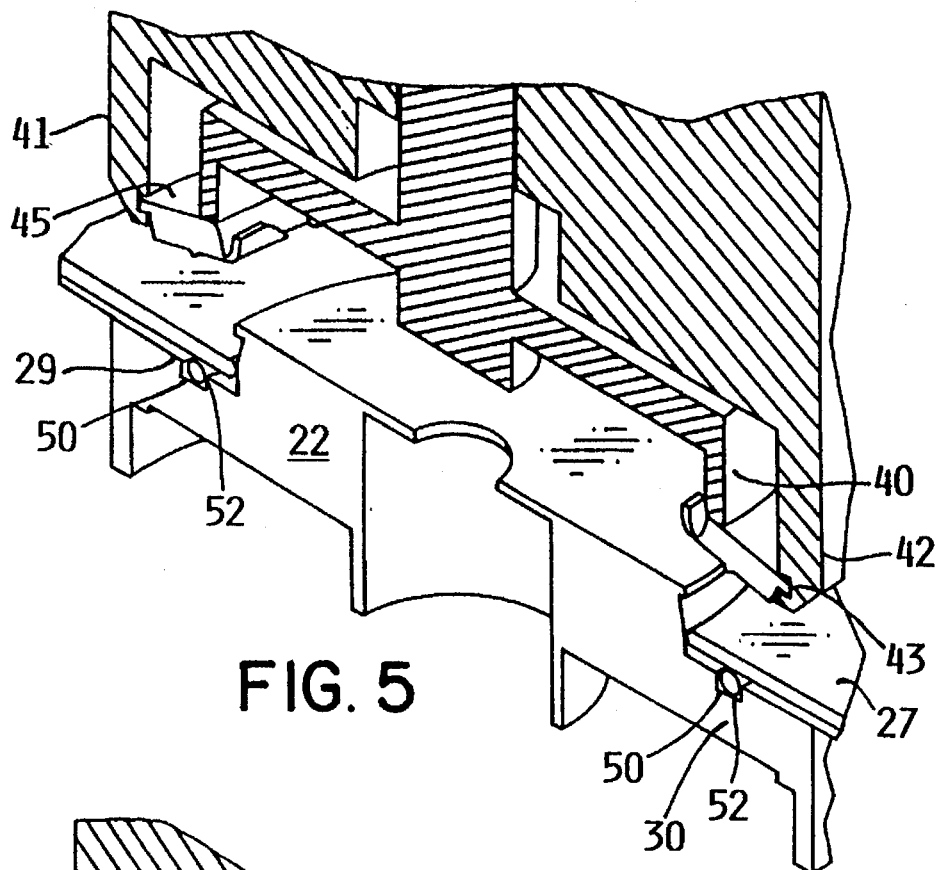
FIGS. 5 through 8 show the hub, disk and clamp of FIG. 3 and further illustrate a pusher tool and a housing tool, all partly in section and partly broken away, with the figures depicting successive stages of an automated assembly of the preferred clamp of the present invention.

FIGS. 5 through 8 show a preferred sequence of securing resilient clamp 10 to hub 22 to compressively capture disk 27 between the clamp and upper surface 29 of hub rim 30. In addition to the enumerated spindle assembly parts, a pusher tool 40 and a housing tool 41 are shown with each of the assembly elements, with the tools partly in section and partly broken away, to schematically illustrate the assembly procedure. It will be observed that the clamp normally has a somewhat conical configuration, as shown in FIG. 5, until compressed and flattened into the assembled condition. The housing tool 41 has six downwardly extending projections 42 that present grooves 43 in which the clamp flange portions 15 are received to retain and align the unassembled clamp. In FIG. 5, pusher tool 40 is in a relaxed or upwardly retracted position, and compliant element 52 is shown in a relaxed state, with the upper surface of compliant element 52 shown protruding above upper surface 29 of rim 30.

Figure 6:
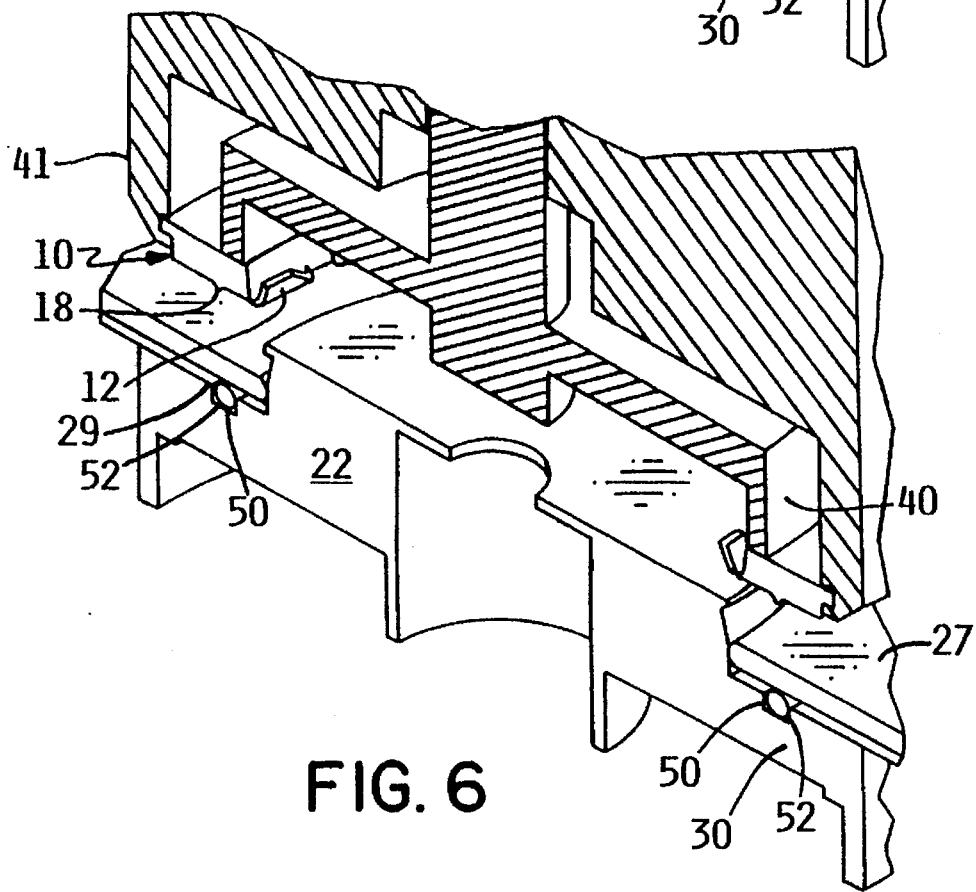

In FIG. 6, pusher tool 40 has been advanced to engage or flatten the clamp as shown with the annular surface of the tool abutting the top surface 45 of annulus 11 adjacent the inner diameter. The clamp is now prepared to be assembled to the hub. Since no downward force has yet been applied to disk 27 by tool 40, compliant element 52 is again shown in FIG. 6 in its relaxed state, with the upper surface of element 52 protruding above upper surface 29 of rim 30.

Figure 7:
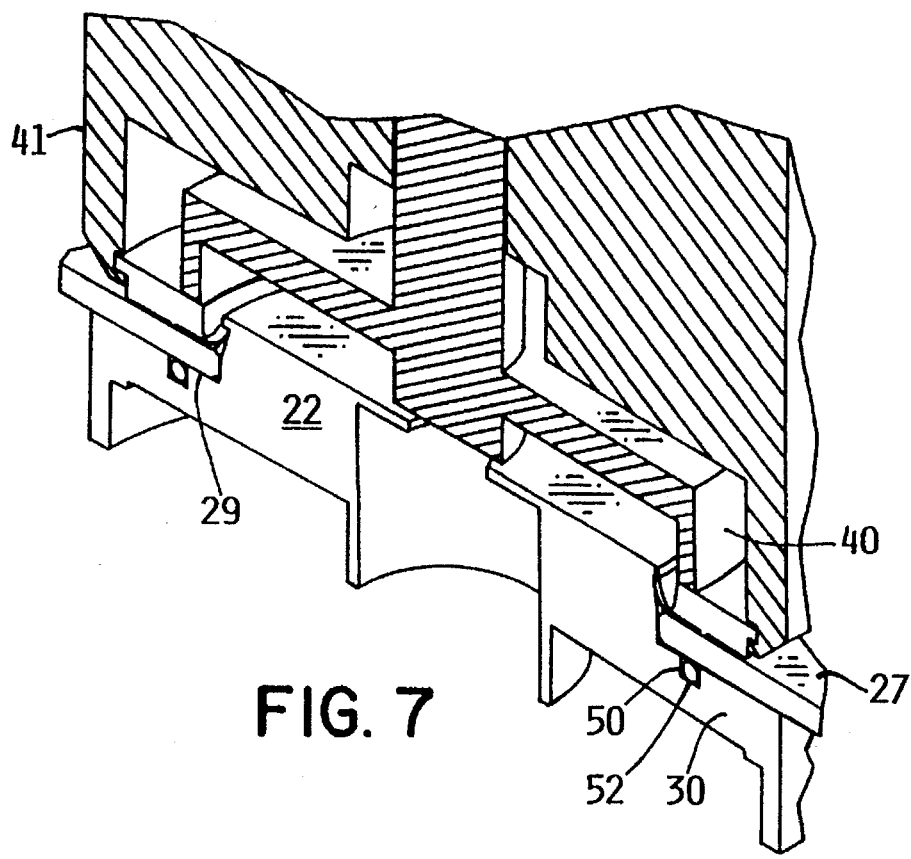

FIG. 7 shows clamp 10 assembled to hub 22 as the pusher tool 40 and housing tool 41 are both moved axially downward causing clamp lobes 12 to deflect radially inward, pass over the end of hub 22 and snap into the secured, assembled position behind hub flange 23. Clamp 10 is now on hub 22 with the pusher tool 40 still holding it in the flattened configuration. Note that compliant element 52 is shown in FIG. 7 in a compressed state, with the upper portion of compliant element 52 being compressed to its preferred position maintained during normal assembly and operating conditions, the upper surface of compliant element 52 being shown compressed completely to the level of upper surface 29 of rim 30 by resilient clamping member 10.

Figure 8:
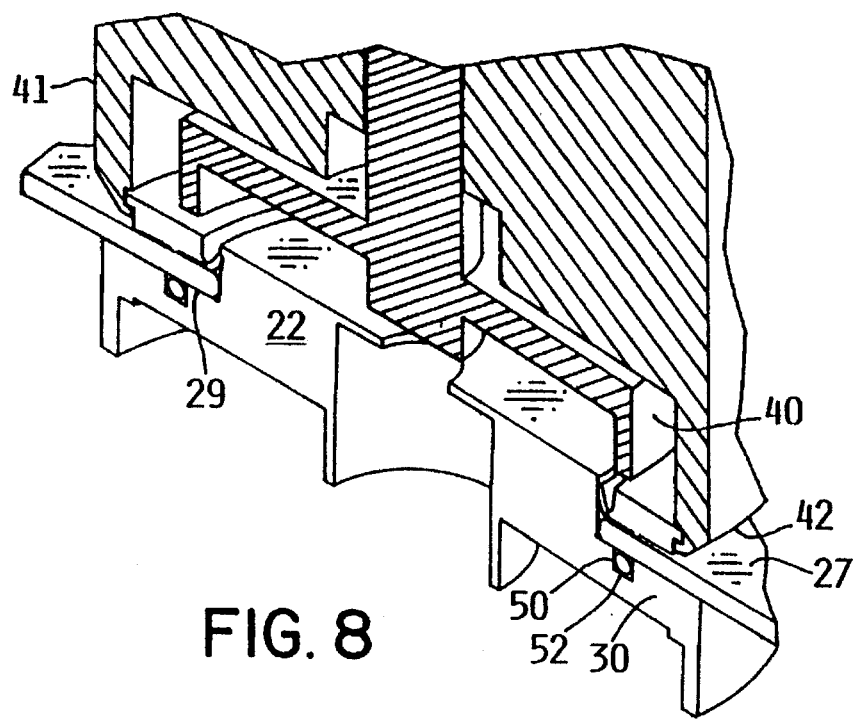

In FIG. 8, pusher tool 40 has been retracted and the clamp is loaded against the disk. The assembly is now completed and it only remains for the housing tool to be rotated 30 degrees to align projections 42 with spaces 16 intermediate clamp flange portions 15 and allow axial removal of the tool assembly from clamp 10. Here again, FIG. 8 shows compliant element 52 in a compressed state, with the upper portion of compliant element 52 being compressed to its preferred position maintained during normal assembly and operating conditions, the upper surface of compliant element 52 being shown compressed completely to the level of upper surface 29 of rim 30 by resilient clamping member 10.

Accordingly, compliant element 52 is supported by rim 30 so that an upper portion of the compliant element is compressed toward, and preferably to, the level of upper surface 29 of rim 30 by the bias of resilient clamping member 10 under normal conditions and, during a shock capable of separating disk 27 away from upper surface 29 of rim 30, compliant element 52 fills at least a portion of space 54 (see FIG. 11B) between the lower side of disk 27 and upper surface 29 of rim 30.

Using the resilient clamp of the present invention, with the lower side of disk 27 biased completely to upper surface 29 of rim 30, the total indicated runout (TIR) that measures the axial variation of the disk surface flatness during rotation, shows no significant difference between clamped and unclamped disks. When associated with thinner aluminum disks of 15 to 20 mils (0.38×0.50 mm) thickness, the TIR was substantially unchanged when disks were clamped and, with thicker aluminum disks of 25 mils (63.5 mm), the TIR of the clamped disks was actually lower than that of the unclamped disks.

Various benefits flow from the combination of the present invention. In the event of a high shock capable of separating the disk from the hub, the compliant element, by expanding to fill the gap or gaps created, reduces the impact of the disk onto the hub. This reduced impact provides a reduction in shocks transmitted to the hub during disk bouncing. The assembly also helps avoid dinging of the disk during bouncing of the disk onto the hub, thus helping to avoid related disk curvature problems. The present invention also reduces the number of bounces of the disk onto the hub and reduces the amount of vibration transmitted to the disk from the bearings in the motor. The present invention provides these advantages both during operational and non-operational shock.

While the invention has been particularly shown and described with reference to a preferred embodiment thereof, it will be understood by those skilled in the art that various changes in form and details may be made therein without departing from the spirit and scope of the invention.

What is claimed is:

1. A disk assembly, comprising:
   (a) a spindle disposed rotatably around a fixed axis, the spindle comprising a rim formed at a lower portion of the spindle, the rim having an upper surface defining a groove, the spindle further comprising an upper portion, the upper portion comprising a flange extending radially outward from the axis and spaced axially above the rim;

(b) at least one disk having a recording surface for recording data, the at least one disk having an upper side, the at least one disk further having a lower side facing the rim;

(c) a resilient clamping member having a lower end facing the upper side of the at least one disk, the resilient clamping member flexibly engaging the upper portion of the spindle for providing bias against the upper side of the at least one disk, the resilient clamping member further comprising an annulus, the annulus including a first portion at an inner radius of the annulus, the first portion extending radially inward and axially upward toward the flange; and (d) a compliant element disposed in the groove and supported by the rim so that an upper portion of the compliant element is compressed toward the upper surface of the rim by the bias of the resilient clamping member;

(e) wherein, during a shock capable of separating the at least one disk a space away from the upper surface of the rim, the resilient clamping member and the compliant element cooperate to allow displacement of the at least one disk in response to the shock and to buffer the displaced at least one disk from impact with the upper surface of the rim, wherein the resilient clamping member flexes to allow the displacement and the compliant element in response to the flexing of the resilient clamping member, expands to fill at least a portion of the space between the lower side of the at least one disk and the upper surface of the rim.

2. The disk assembly of claim 1 wherein:

(a) the upper surface of the rim includes a disk receiving surface having an inner edge and an outer edge, wherein the inner edge and outer edge define the groove therebetween; and (b) the compliant element is disposed in the groove so that, in its relaxed state, a portion of the compliant element protrudes above the disk receiving surface of the rim.

3. The disk assembly of claim 2 wherein the compliant element comprises an O-ring.

4. The disk assembly of claim 1 wherein the upper surface includes a disk receiving surface, the disk receiving surface and the spindle axis defining the groove therebetween, and wherein the compliant element comprises a soft ring formed in substantially an "L" configuration comprising a vertical leg member and a horizontal leg member, the compliant element being spaced apart from the spindle and positioned in the groove such that, in a relaxed state of the compliant element, a portion of the compliant element protrudes above the upper surface of the rim.

5. The disk assembly of claim 4 wherein:

(a) the vertical leg member provides an outer surface for self-centering the at least one disk; and (b) the horizontal leg member is supported by the rim so that an upper portion of the horizontal leg member is compressed toward the level of the upper surface of the rim by the resilient clamping member and so that, during a shock capable of separating the at least one disk away from the upper surface of the rim, the horizontal leg member fills at least a portion of the space between the lower side of the at least one disk and the upper surface of the rim.

6. The disk assembly of claim 1 wherein a plurality of compliant elements are supported by the rim.

7. The disk assembly of claim 6 wherein:

(a) each of the compliant elements comprises soft ball; and (b) the spindle defines a plurality of cups formed in the upper surface of the rim for holding the soft balls.

8. The disk assembly of claim 1 wherein the compliant element is supported by the rim so that the compliant element is compressed completely to the upper surface of the rim by the resilient clamping member and so that, during a shock capable of separating the at lest one disk away from the upper surface of the rim, the compliant element fills at least a portion of the space between the lower side of the at least one disk and the upper surface of the rim.

9. The disk assembly of claim 1, wherein the annulus comprises:

a projecting portion the projecting portion being at an axial side of the annulus which confronts the at least one disk and being deformed against the confronted side of the disk in order to bias the disk toward the level of the upper surface of the rim when the annulus first portion is retained by the flange.

10. A disk data storage device, comprising:

(a) a base;

(b) a spindle disposed rotatably around a fixed axis coupled to the base, the spindle comprising a rim formed at a lower portion of the spindle, the rim having an upper surface defining a groove, the spindle further comprising an upper portion, the upper portion comprising a flange extending radially outward from the axis and spaced axially above the rim;

(c) at least one disk having a recording surface for recording data, the at least one disk having an upper side, the at least one disk further having a lower side facing the rim;

(d) a resilient clamping member having a lower end facing the upper side of the at least one disk, the resilient clamping member flexibly engaging the upper portion of the spindle for providing a bias against the upper side of the at least one disk, the resilient clamping member further comprising an annulus, the annulus including a first portion at an inner radius of the annulus, the first portion extending radially inward and axially upward toward the flange; and (e) a compliant element disposed in the groove and supported by the rim so that an upper portion of the compliant element is compressed toward the upper surface of the rim by the bias of the resilient clamping member, wherein, during a shock capable of separating the at least one disk a space away from the upper surface of the rim, the resilient clamping member and the compliant element cooperate to allow displacement of the at least one disk in response to the shock and to buffer the displaced at least one disk from impact with the upper surface of the rim, wherein the resilient clamping member flexes to allow the displacement and the compliant element in response to the flexing of the resilient clamping member expands to fill at least a portion of the space between the lower side of the at least one disk and the upper surface of the rim; and (f) a transducer mounted on an actuator for accessing data recorded on the recording surface.

11. The disk assembly of claim 10 wherein:

(a) the upper surface of the rim includes a disk receiving surface having an inner edge and an outer edge, wherein the inner edge and outer edge define the groove therebetween; and (b) the compliant element is disposed in the groove so that, in a relaxed state of the compliant element, a portion of the compliant element protrudes above the disk receiving surface of the rim.

12. The disk assembly of claim 11 wherein the compliant element comprises an O-ring.

13. The disk assembly of claim 10, wherein the upper surface includes a disk receiving surface, the disk receiving surface and the spindle axis defining the groove therebetween, and wherein the compliant element comprises a soft ring formed in substantially an "L" configuration comprising a vertical leg member and a horizontal leg member, the compliant element being spaced apart from the spindle and positioned in the groove such that in a relaxed state of the compliant element, a portion of the compliant element protrudes above the upper surface of the rim.

14. The disk assembly of claim 13 wherein:

(a) the vertical leg member provides an outer surface for self-centering the at least one disk; and (b) the horizontal leg member is supported by the rim so that an upper portion of the horizontal leg member is compressed toward the level of the upper surface of the rim by the resilient clamping member and so that, during a shock capable of separating the at least one disk away from the upper surface of the rim, the horizontal leg member fills at least a portion of the space between the lower side of the at least one disk and the upper surface of the rim.

15. The disk assembly of claim 10 wherein a plurality of compliant elements are supported by the rim.

16. The disk assembly of claim 15 wherein:

(a) each of the compliant elements comprises soft ball; and (b) the spindle defines a plurality of cups formed in the upper surface of the rim for holding the soft balls.

17. The disk assembly of claim 10 wherein the compliant element is supported by the rim so that the compliant element is compressed completely to the level of the upper surface of the rim by the resilient clamping member under normal operation and so that, during a high shock capable of separating the at least one disk away from the upper surface of the rim, the compliant element fills at least a portion of the space between the lower side of the at least one disk and the upper surface of the rim.

18. The disk assembly of claim 10, wherein the annulus comprises:

a projecting portion of the annulus, the projecting portion being at an axial side of the annulus which confronts the at least one disk and being deformed against the confronted side of the disk in order to bias the disk toward the level of the upper surface of the rim when the annulus first portion is retained by the flange.

* * * * *